(12) United States Patent
Frances et al.

(10) Patent No.: US 7,531,113 B2
(45) Date of Patent: May 12, 2009

(54) ABRASION RESISTANT FLUOROPOLYMER COMPOSITIONS CONTAINING MICROPULP

(75) Inventors: Arnold Frances, Glen Allen, VA (US); Laurence Waino McKeen, Sewell, NJ (US); Osamu Hayakawa, Shizuoka (JP); Arnold Lewis Montgomery Service, East Amherst, NY (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 551 days.

(21) Appl. No.: 11/138,972

(22) Filed: May 26, 2005

(65) Prior Publication Data

US 2005/0267260 A1    Dec. 1, 2005

Related U.S. Application Data

(60) Provisional application No. 60/575,176, filed on May 28, 2004.

(51) Int. Cl.
  *H01B 1/14* (2006.01)
  *C08F 14/18* (2006.01)

(52) U.S. Cl. ............ 252/500; 523/210; 523/212; 523/216; 524/444; 524/449; 524/450; 525/178

(58) Field of Classification Search ............ 525/178; 252/500; 523/210, 212, 216; 524/444, 449, 524/450
See application file for complete search history.

(56) References Cited

U.S. PATENT DOCUMENTS

| | | |
|---|---|---|
| 2,999,788 A | 9/1961 | Morgan |
| 3,087,827 A | 4/1963 | Klenke, Jr., et al. |
| 3,087,828 A | 4/1963 | Linton |
| 3,087,829 A | 4/1963 | Linton |
| 3,767,756 A | 10/1973 | Blades |
| 3,869,429 A | 3/1975 | Blades |
| 3,869,430 A | 3/1975 | Blades |
| 4,514,541 A | 4/1985 | Frances |
| 5,230,952 A | 7/1993 | McCord |
| 5,474,842 A | 12/1995 | Hoiness |
| 5,811,042 A | 9/1998 | Hoiness |
| 5,911,514 A | 6/1999 | Davies et al. |
| 6,390,682 B1 | 5/2002 | McMeekin et al. |
| 6,485,608 B1 * | 11/2002 | McDonald et al. .......... 162/103 |
| 6,518,349 B1 | 2/2003 | Felix et al. |
| 2001/0021744 A1 | 9/2001 | Araki et al. |
| 2001/0031596 A1 | 10/2001 | McDonald et al. |
| 2002/0187291 A1 | 12/2002 | Philippoz et al. |
| 2003/0114641 A1 | 6/2003 | Kelly et al. |
| 2004/0019167 A1 | 1/2004 | Smith et al. |
| 2004/0119948 A1 | 6/2004 | Kawaai et al. |

FOREIGN PATENT DOCUMENTS

| | | | |
|---|---|---|---|
| EP | 0 492 645 A2 | | 7/1992 |
| JP | 11217504 | | 8/1999 |
| JP | 2000143922 | | 5/2000 |
| WO | WO 00/55252 | | 9/2000 |
| WO | 02/14066 | * | 2/2002 |

* cited by examiner

*Primary Examiner*—Ana L Woodward

(57) ABSTRACT

The present invention provides an abrasion resistant composition comprising fluoropolymer and an effective amount of micropulp to increase the abrasion resistance of an article such as a film formed from the composition by at least 25% as compared to film formed from the fluoropolymer by itself. In an especially preferred embodiment, the composition also contains an effective amount of pigment to further increase the abrasion resistance of film formed from the composition as compared to film formed from the fluoropolymer by itself. The invention is especially useful for films formed on a fuser roll.

14 Claims, No Drawings

ABRASION RESISTANT FLUOROPOLYMER COMPOSITIONS CONTAINING MICROPULP

FIELD OF THE INVENTION

This invention relates to fluoropolymer compositions containing additives that increase the abrasion resistance of articles formed from the compositions.

BACKGROUND OF THE INVENTION

Fluoropolymers resins have exceptional stability to light, heat, solvents, chemical attack and electrical stresses, conferring desirable properties to articles made from these polymers or substrates coated with films of the polymers. Such resins, especially perfluoropolymer resins, are known for their low surface energy and release/non-stick characteristics. Mechanical properties such as abrasion resistance can be improved by incorporating additives into these resins and thereby extending their service life, but such addition results in diminishing the release properties of the polymers.

One important application for fluoropolymers is in electrostatographic reproduction wherein electrostatically charged toner is fused to a receiver (e.g., paper or film) making visible a latent electrostatic image. The use of fluoropolymer resin film coatings on heated metal fuser rolls provides a heat resistant polymer film having a release surface that prevents the sticking of toner to the fuser roll and allows more toner to affix to the receiver for production of high quality printed images. The heated fuser roll is heated to a high temperature, usually at about 200° C., to melt the toner particles electrostatically deposited on a receiver and then releases the resultant molten image as it adheres to the receiver. If molten toner particles stay adhered to the fuser roll, they can deposit on a later supplied receiver to provide an undesired image. Thus, the fuser roll coating application of fluoropolymer resin embodies a critical requirement for faithfully releasing molten toner, which by its molten nature and need to stick to the receiver is a sticky material. While fluoropolymer resin coating has been successfully used in this application, the coating suffers from the shortcoming of being abraded away both by the receivers sequentially contacting the fuser roll and even more severely by the picker fingers that rub against the fuser roll surface to remove a receiver from the fuser roll. The problem is how to increase the abrasion resistance of the coating without adversely affecting its release property.

BRIEF SUMMARY OF THE INVENTION

The present invention solves this problem by providing a composition comprising fluoropolymer and an effective amount of micropulp to increase the abrasion resistance of the surface of an article formed from the composition by at least 25% as compared to the surface of the article formed from the fluoropolymer by itself. The preferred form of the article is a film, either unsupported or supported, e.g., as a coating on a substrate such as a fuser roll. The description of the invention hereinafter will refer to the preferred film form, but this description is applicable to articles such as blocks, panels, sheets and other molded forms in general so as to embody the same improvements as obtained for the film. The composition of the present invention is applicable to improving the abrasion resistance of fluoropolymer resin coatings without adversely affecting its release property in general, as well, as to the release coating on fuser rolls in electrostatic reproduction in particular. The micropulp is an organic fibrous material comprising fibrils having cross-sections with a width dimension less 10 nanometers. When formed into a coating on a substrate, such as a fuser roll core, sufficient of these fibrils are present at the surface of the coating to provide improved abrasion resistance. Notwithstanding the fibril nature of the micropulp, the surface of the coating retains adequate release property even as the coating becomes worn from repeated usage. The fresh fibrils from the micropulp coming to the wearing surface of the coating do not cause molten toner particles to adhere to the fuser roll coating instead of the receiver.

In a preferred embodiment, the composition also contains an effective amount of pigment to further increase the abrasion resistance of film formed from the composition as compared to film formed from the fluoropolymer by itself.

In the fuser roll coating application, the composition will usually contain a small amount electrically conductive particulate material in an effective amount to prevent build up of electrical charge on the fuser roll that could attract toner particles from the receiver prior to contact with and fusing by the fuser roll. This additive has a negligible effect on abrasion resistance of the fluoropolymer resin coating and therefore can be included in the fluoropolymer in the abrasion testing for determining the abrasion resistance of the fluoropolymer by itself.

The micropulp has a preferred volume average length in the range of 0.01 to 125 micrometers. Preferably the micropulp is synthetic organic polymer, most preferably, an aromatic polyamide, commonly known as aramid.

The invention further relates to films formed from the composition, especially a film formed on a fuser roll.

DETAILED DESCRIPTION OF THE INVENTION

The improved composition of this invention which combines both good abrasion resistance and good release is best illustrated by use of this composition as a film coating for fuser rolls in copy machines and laser printers. For example, in electrostatographic reproduction in a copy machine, a uniformly charged imaging roll is exposed to a laser to create a series of electrostatic images. Toner is subsequently applied to each of the images on the imaging roll to create a series of toner images corresponding to the electrostatic images. The toner images are transferred to a receiver such as paper or film. The receiver bearing the toner images is separated from the imaging roll and fed to a fusing apparatus. The fusing apparatus is commonly composed of two rolls which form a nip through which the receiver passes. The top roll is generally a fluoropolymer coated metal roll, hereinafter designated as the 'fuser roll'. The second roll, herein after designated as the "support roll" cooperates with the fuser roll to form the nip and is commonly made of a compliant elastomeric material, such as silicone rubber. The fuser roll is heated, often by an internal heat source disposed in the core of the fuser roll.

The use of fluoropolymer resin film coatings on the heated metal fuser roll provides a heat resistant polymer film having a release surface that prevents the sticking of toner to the fuser roll and allows more toner to affix to the receiver for production of high quality printed images. However, the high volume of paper that passes through a copier and the pressure of the picker fingers on the fuser roll surface have a wearing effect on prior art fluoropolymer coatings causing the coating to wear away, thereby losing its effectiveness as a release surface. As will be shown in the Examples, the fluoropolymer resin composition of the present invention containing an effective amount of micropulp improves the abrasion resistance of a film formed from the composition by at least 25%, preferably at least 50%, as compared to film formed from the fluoropolymer by itself.

The micropulp additive used in this invention, when the additive is aramid, has a volume average fiber length of less than one tenth the size of conventional short aramid fiber used for matrix resin reinforcement in U.S. Pat. Nos. 5,811,042 and 5,474,842 (both to Hoiness) along with fibril-free aramid microparticles for increasing wear resistance of the matrix resin. The present invention obtains improved wear resistance with micropulp, which is entirely fibrillar, i.e., in the absence of fibril-free aramid microparticles, and achieves this improvement without diminishing release. Further, unexpectedly, when certain pigments, such as zeolites, are added to the fluoropolymer composition containing micropulp, there is a synergistic effect such that there is as much more than a 100%, and even more than a 200% improvement in abrasion resistance of a film formed from the composition as compared to film formed from fluoropolymer itself.

Fluoropolymers

The fluoropolymer in the composition of the film of this invention is independently selected from the group of polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, and vinyl fluoride and blends thereof and blends of said polymers with a nonfluoropolymer.

The fluoropolymers used in this invention are preferably melt-processable. By melt-processable it is meant that the polymer can be processed in the molten state(i.e., fabricated from the melt into shaped articles such as films, fibers, and tubes etc. that exhibit sufficient strength and toughness to be useful their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processable copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa.s to about $10^6$ Pa.s, preferably $10^3$ to about $10^5$ Pa.s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride(PVDF) and copolymers of vinylidene fluoride as well as polyvinyl fluoride (PVF) and copolymers of vinyl fluoride.

While the fluoropolymer component is preferably melt-processable, polytetrafluoroethylene (PTFE) including modified PTFE which is not melt-processable may be used together with melt-processable fluoropolymer or in place of such fluoropolymer. By modified PTFE is meant PTFE containing a small amount of comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. The amount of such modifier will be insufficient to confer melt fabricability to the PTFE, generally no more than 0.5 mole %. The PTFE, also for simplicity, can have a single melt viscosity, usually at least $1 \times 10^9$ Pa.s, but a mixture of PTFE's having different melt viscosities can be used to form the fluoropolymer component. Such high melt viscosity indicates that the PTFE does not flow in the molten state and therefore is not melt-processable.

As one skilled in the art will recognize, mixtures of different types of fluoropolymers can be used in the practice of this invention.

The compositions of the present invention include the composition applied to the a fuser roll to form a cover thereon and the composition of the cover, or in more general terms, the film, such as that formed on the surface of the fuser roll. With respect to the composition used to form the cover, these fluoropolymers as used in the present invention are in the form of particles, having an average particle size of from less than 1 μm up to about 100 μm. Many of the fluoropolymers are made by aqueous dispersion polymerization, wherein the fluoropolymer particles as polymerized are typically in the range of 0.1 to 0.3 μm in diameter. The particle sizes disclosed herein are average particle sizes. The fluoropolymer component can also be present in large particle sizes, such as 5 to 100 μm, preferably 10 to 20 μm in diameter. Such large particle sizes can be made by coagulation from dispersion or by spray drying as described in U.S. Pat. No. 6,518,349 B1 (Felix et al.) with an optional grinding step to obtain particles of the desired size. In one preferred embodiment, submicron particles (dispersion particles) and larger particles (powder particles) are both present.

While the fluoropolymers used in the present invention are melt processable, film of the composition containing the fluoropolymer will generally be formed by first providing the composition as a liquid medium, wherein the fluoropolymer particles are dispersed in either an organic solvent or water or a mixture thereof, applying this liquid composition to the substrate to be coated, followed by drying and baking the coating to form a release coating on the substrate. Preferably, the dispersion contains fluoropolymer particles from both particle size groupings mentioned above, e.g., about 15 wt % to about 30 wt % of the submicron size particles together with about 10 wt % to about 20 wt % of the larger size particles.

Examples of organic solvents include N-methylpyrrolidone, butyrolacetone, high boiling aromatic solvents, include alcohols such as methanol, ethanol, isopropanol and t-butanol, ketones such as acetone and methyl ethyl ketone (MEK), and mixtures thereof In another embodiment, the composition of this invention can be in the form of powder for powder coating a surface, such as a fuser roll surface, to form a film. In both embodiments, coating from a liquid medium and powder coating, the melt processibility of the fluoropolymer enables the fluoropolymer particles to fuse together during baking to form a continuous film (coating).

Micropulp

The composition of this invention comprises fluoropolymer and an effective amount of micropulp of fibrous organic material to increase the abrasion resistance of a film formed from said composition by at least 25%, preferably at least 50%, as compared to film formed from the fluoropolymer by itself. With respect to the baked composition, i.e. the film, the micropulp constitutes 0.1 wt % to 4 wt % based on the total weight of the dry ingredients including the fluoropolymer, preferably in the range of from about 0.25 wt % to 3 wt %.

The micropulp and its preparation are fully described in U.S. patent applications, US 2003/0114641 A1 and 2004/0119948, both to Kelly et al. Generally the micropulp used in this invention is a fibrous material that includes an intermeshed combination of two or more webbed, dendritic, branched, mushroomed or fibril structures. Generally the shape of the particles forming the micropulp are clumps of minute fibrils as depicted in FIG. 4 of US 2003/0114641 A1. The organic fibers suitable for use in the present invention can be made of organic synthetic polymers such as aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. More preferred polymers are made from aromatic polyamides, polybenzoxadiazole, polybenzimidazole, or a mixture thereof. Still more preferred organic fibers are aromatic polyamides ((p-phenylene terephthalamide), poly(m-phenylene isophthalamide), or a mixture thereof).

More particularly, the aromatic polyamide organic fibers disclosed in U.S. Pat. Nos. 5,811,042, 3,869,430; 3,869,429; 3,767,756; and 2,999,788, all of which are incorporated herein by reference, are preferred as starting materials for the preparation of micropulp. As described fully US 2003/0114641 A1, micropulp is prepared by contacting organic fibers with a medium containing liquid and solid components and agitating such as by milling the medium and organic fibers to transform the organic fibers to micropulp dispersed in the medium. The micropulp can be used as a slurry or separated from the medium. Some commercially available organic fibers useful as starting materials for making micropulp are available from DuPont Company, Wilmington, Del. as fibers. These fibers can be in the form of continuous filament; short fibers either produced directly or cut from the continuous filament; pulp or fibrids. The length of these short fibers typically vary from about 1 mm to 12 mm. These aramid fibers are available as Kevlar® Aramid Pulp, 1F543, 1.5 mm Kevlar® Aramid Floc 6F561, DuPont Nomex® aramid Fibrids F25W. The milling treatment reduces the length of the starting fiber at least 10 fold while causing the fiber to fibrillate.

Other suitable commercial organic synthetic polymer fibers include: Zylon® PBO-AS (Poly(p-phenylene-2,6-benzobisoxazole) fiber, Zylon® PBO-HM (Poly(p-phenylene-2,6-benzobisoxazole)) fiber, Dyneema® SK60 and SK71 ultra high strength polyethylene fiber, all supplied by Toyobo, Japan. Celanese Vectran® HS pulp, EFT 1063-178, supplied by Engineering Fibers Technology, Shelton, Conn. CFF Fibrillated Acrylic Fiber supplied by Sterling Fibers Inc, Pace, Fla. Tiara Aramid KY400S Pulp supplied by Daicel Chemical Industries, Ltd, 1 Teppo-Cho, Sakai City Japan.

Preferably the micropulp included in the fluoropolymer composition of this invention has a volume average length ranging from 0.01 micrometers to 125 micrometers, preferably ranging from 1 micrometer to 50 micrometers and more preferably from ranging from 5 micrometers to 30 micrometers. The smaller the volume average fibril length in the micropulp, the smoother is the surface of the film formed from the composition. As the volume average length increases, so does the roughness of the surface of the resultant film increase, which detracts from the release property of the film. It has been found that even the longer volume average fibril lengths of up to 125 micrometers, while providing improved wear resistance, can also provide good release property, by undertaking the additional step of honing the surface of the film formed from the composition, using a fine grit such as 600 grit. When the film forms the surface of a roll such as a fuser roll, the roll can be rotated and the hone passed along its surface during such rotation to provide the smoothness desired. While this honing removes the "peaks" of micropulp and overlying fluoropolymer, the resultant honed film nevertheless provides both improved abrasion resistance and good release property with fluoropolymer being retained on the surface with the aid of the fibrillar micropulp. The smoothness of the film surface desired is generally determined visually, i.e., the surface of the film should have a smooth surface generally free of topography. It has been unexpectedly found that when micropulp has a volume average length of from 5 to 30 micrometers, that optimum abrasion resistance in combination with good release can be obtained, especially in fuser roll coatings. Film from compositions of the present invention containing these smaller volume average lengths form smooth film surfaces without the need for honing to obtain surface smoothness.

As used herein, the volume average length as determined by laser diffraction and described in Example 13 of US 2003/0114641 A1 means:

$$\frac{\sum (\text{number of fibers of given length}) \times (\text{length of each fiber})^4}{\sum (\text{number of fibers of given length}) \times (\text{length of each fiber})^3}$$

Generally, the micropulp comprising fibrous organic material has an average surface area ranging from 25 to 500 square meter per gram, preferably ranging from 25 to 200 square meter per gram and more preferably ranging from 30 to 80 square meter per gram. The fibrils of the micropulp generally have aspect ratios (length-to-diameter) of at least 10:1. Applicants have also unexpectedly discovered that including the micropulp in a coating composition results in a coating with improved abrasion resistance with good release and can be applied to substrates such as fuser rolls. While the micropulp and particles of fluoropolymer can be intermixed with one another, as will be described hereinafter, they do not interact with one another, even under the condition of baking to form a film from the composition. Fluoropolymer is well known to be both non-polar and chemically non-reactive, whereby there is no detectible reaction between the fluoropolymer and micropulp in the film formed from the composition.

Other Additives

The composition may contain other additives, such as pigments and electrically conductive particulate material, in addition to fluoropolymer and micropulp. These additives are also non-reactive with respect to the fluoropolymer and the micropulp as well in the use of the composition to form a film.

It is generally preferred that coating compositions used on fuser rolls contain an effective amount of electrically conductive particulate material that aid in the dissipation of static buildup. In a preferred embodiment of this invention electrically conductive particulate material such as mica is included in the composition of this invention. The mica is rendered conductive by a coating on the mica flakes such as antimony or tin oxide. The composition could alternately contain graphite or Ketjen Black as an electrically conductive additive. By electrically conductive, it is meant that the surface resistivity of the particulate material as measured with a Pin-ion meter is less than $10^8$ ohms/square. The effective amount of electrically conductive particulate material to prevent static buildup will depend on the particular material used. For example, when the particulate material is electrically conductive carbon, only about 1 to 2 wt % thereof is needed. When the material is electrically conductive mica (mica coated with electrically conductive material), generally about 3 to 8 wt % thereof is needed. These weights are based on the total dry weight of the composition, which is the same as the baked weight. Both electrically conductive carbon and electrically conductive mica can be used in the same composition to lessen the amount of electrically conductive carbon and reduce its influence on the color of the composition.

Mica is in the form of platelet-shaped particles. The preferred platelet shaped particles of mica have an average particle size of about 10 to 200 microns, preferably 20-100 microns, with no more than 50% of the particles of flake having average particle size of more than about 300 microns. The mica particles coated with oxide layer are those described in U. S. Pat. No. 3,087,827 (Klenke and Stratton); U.S. Pat. No. 3,087,828 (Linton); and U.S. Pat. No. 3,087,829 (Linton).

It has been found that the combination of certain pigments with micropulp in compositions containing fluoropolymer exhibit an increase in abrasion resistance beyond that which would be expected. In particular, pigments of zeolite as further defined below are especially desirable. A preferred composition of this invention comprising fluoropolymer and micropulp also contains an effective amount of pigment to further increase the abrasion resistance of film formed from the composition as compared to a film formed from fluoropolymer alone. The abrasion resistance of a film from the composition comprising fluoropolymer, micropulp and pigment is increased by at least 50%, preferably at least 100%, more preferably at least 200%, and most preferably at least 300%.

In especially preferred embodiments, the composition of this invention is a liquid dispersion of fluoropolymer, micropulp, and pigment wherein the pigment constitutes generally from about 1 to about 12 wt %, based on the total weight of the dried film. When the composition is formed into a film, the total amount of micropulp, electrically conductive particulate material, and pigment is at least about 4 wt % based on the total weight of these ingredients plus the fluoropolymer, preferably in the range of from about 4 wt % to about 14 wt %. The composition can contain such large amounts of pigment and electrically conductive material because of their low densities relative to the density of fluoropolymer, which results in much smaller volume % amounts of these additives. Thus, while the compositions of the present invention will contain from about 86 to 96 wt % fluoropolymer, the volume % of this component will be much higher.

Zeolites, as the preferred pigment, are reversibly hydrated aluminum silicates generally containing alkali or alkaline earth metal oxides which sometimes can be ion exchanged for other metals or hydrogen. A general structure definition is

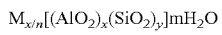

wherein M is a cation of valence n, and n is 1 or 2. The ratio of x to y can vary from 1 to a large number as is known in the art. Zeolites include many naturally occurring minerals and synthetic materials. The class of minerals known as feldspathoids is closely related to zeolites and is included herein in the, meaning of the term zeolite. Feldspathoids, including sodalite and ultramarine, .with open structure and large cavities are closely related to zeolites. A preferred zeolite is ultramarine blue (UMB), an alkali metal aluminum silicate. Generally the particle size of zeolites Used in this invention is generally less than 5 micrometers, and typically in the range of 0.5 to 3 micrometers.

The addition of ultramarine blue to the composition provides for smooth coatings and an attractive, easily identifiable blue colored film coating.

Unexpectedly, the zeolite and micropulp when present in the same fluoropolymer composition, both contribute to the abrasion resistance of the surface of the film formed from the composition, so that a greater abrasion resistance can be obtained when both additives are used, and still the desired release property of the surface of the film can be retained.

Film Formation

In one embodiment, a film of the composition of this invention is formed by applying the composition directly to a substrate as a liquid dispersion by conventional means such as spray-coating, dipping, roller coating or curtain-coating followed by heating and fusing at a temperature of 310° C. to 430° C. to generate film coatings at a thickness in the range of 0.3 mils (7.6 micrometers) to 2 mils (50 micrometers), preferably 0.7 mils (18 micrometers) to 1.4 mils (36 micrometers).

In a preferred embodiment, the dispersion of this invention is applied after first priming the substrate with a primer composition containing a heat resistant polymer binder, the presence of which enables the primer layer to adhere to the substrate. Such binder composition may optionally contain fluoropolymer. The binder component is composed of polymer which is film-forming upon heating to fusion and is also thermally stable. This component is well known in primer applications for non-stick finishes, for adhering a fluoropolymer-containing primer layer to substrates and for film-forming within and as part of a primer layer. The binder is generally non-fluorine containing and yet adheres to the fluoropolymer.

Examples of the non-fluorinated thermally stable polymers include polyamideimide (PAI), polyimide (PI), polyphenylene sulfide (PPS), polyether sulfone (PES), polyarylene-etherketone, and poly(1,4(2,6-dimethylephenyl)oxide) commonly known as polyphenylene oxide (PPO). These polymers are also fluorine-free and are thermoplastic. All of these resins are thermally stable at a temperature of at least 140° C.

In an alternate embodiment, films are obtained by electrostatic application of powder compositions of this invention directly to a substrate or to a primed substrate with subsequent heating and fusing at temperatures in the range of 310° C. to 430° C.

When compositions of this invention are applied as a an overcoat on a primer, the primer layer generally has a thickness of about 4 to about 15 micrometers and the overcoat (composition of the present invention) generally has a thickness of about 12 to about 50 micrometers. Multiple overcoats may be applied.

Films of the composition of this invention are formed on any substrate material which can withstand the bake temperature, such as metal and ceramics, examples of which include aluminum, anodized aluminum, cold-rolled steel, stainless steel, enamel, glass, and pyroceram. The substrate can be smooth, etched or grit blasted.

Preferred products having surface films formed using compositions of the present invention include fuser rolls and belts, pipes, conveyors, chemical processing equipment, including tanks, chutes, roll surfaces, cutting blades, iron sole plates, cookware, bakeware etc. Other applications include films used in aircraft interiors, graffiti-resistant coverings for interior or exterior architectural paneling and flexible fabrics, and protective coverings for numerous thermoplastic and thermoset surfaces and parts.

Test Methods

Abrasion Test—Thrust Method

The Falex friction and wear test machine available from the FALEX corporation, SugarGrove, Ill. and designated in ASTM D3072 is used to determine the wear index of a coating. A stationary aluminum washer specimen is placed in the lower specimen holder. The washer configuration is designated in ASTM D3072. A coated rotating wafer specimen is mounted on the rotary spindle in contact with the lower stationary aluminum washer specimen. A load of 21.8 kilograms is then applied. The specimen rotation speed is set at 500 rpm. After every 5,000 cycles, the test is stopped and the weight loss is recorded. The test continues up to 30,000 cycles or when the substrate begins to show through (the substrate becomes visible). The wear index is determined in total cycles of abrasion per the total weight loss in milligrams (cycles/milligram of wear).

Abrasion Test—Roller Abrasion

An abrasion resistance test meant to simulate abrasion against a fusion roll by paper in a copier machine is used to determine the wear rate of a coating. The diameter of the test roller is carefully and accurately measured. The test roller is mounted in a rotation configuration. Standard paper cash register tape, 2.25 inches (5.7 cm) wide is pressed against the roller by applying a 610 g weight to the paper along a 0.25 inch (0.64 cm) contact path. The roller rotates at 60 rpm. After every 10 rotations, the paper tape moves 0.29 inches (0.74 cm) to apply new paper to the surface being abraded. The temperature is room temperature, air conditioned approximately 75° F. (24° C.). After 10,000 cycles or when the substrate begins to show through, the test is stopped and the rotations are recorded. The diameter of the roller on the worn area is measured. The wear rate is calculated as cycles per micron of wear.

Abrasion Test—Reciprocating Arm Abrasion Test

Film structures are tested using a Reciprocating Arm Abrasion Tester (available from Byk Garnder, Columbia Md.) with nylon brush (WA 2262 also available from Byk Gardner). The 60 degree gloss of the films is measured using a micro-TRI-gloss meter available from Byk Gardner according to ASTM method D523 after subjecting the film to 0 and 50 cycles of the Abrasion Tester. One cycle is one reciprocating movement to and fro of the brush. Films are evaluated for gloss loss.

Release Test

Release of the coating composition on a fuser roll was tested on a commercial copier machine, Ricoh AF 350. The coating was judged by the number of copies produced without toner contamination. Toner contamination is a result of poor release of toner from the fuser roll such that toner builds up on the roll resulting in poor quality copies.

EXAMPLES

In the following Examples, substrates for coating are cleaned by baking 30 min @ 800° F. (427° C.) and grit blasted with 40 grit aluminum oxide) to a roughness of approximately 70-125 microinches Ra. Liquid coatings are applied by using a spray gun, Model Number MSA-510 available from DeVilbiss located in Glendale Heights, Ill.

For examples 1 and 2, a layer of primer is applied on a rotating wafer specimen of steel followed by baking at 66° C. for 5 minutes. The rotating wafer configuration is designated in ASTM D3072. The dry film thickness (DFT) of the primer layer is about 10 micrometers. Overcoat is applied two times followed by baking at 65° C. for 5 minutes and then baked at 149° C. for 10 minutes. The coated disc is finally baked at 399° C. for 5 minutes. The total dry film thickness (DFT) of the coating is around 100 micrometers. This coated specimen is tested by the Thrust Abrasion Weight Loss method.

The primer used in the Examples has the following pre-bake composition:

TABLE 1

| Ingredients | Liquid Primer | Wt % |
|---|---|---|
| Fluoropolymer | PTFE dispersion | 12.8 |
|  | PFA dispersion | 8.8 |
|  | FEP dispersion | 9.5 |
| Polymer binder | Polyamideimide | 4.6 |
| Colloidal Silica |  | 2.9 |
| Solvents | Water | 50.4 |
|  | Other Organics* | 7.3 |
| Pigments |  | 3.4 |
| Dispersing Agent |  | 0.3 |
| Total |  | 100 |

*Other organics may include solvents such as N-methyl-2-pyrrolidone, MIBK (methyl isobutyl ketone), hydrocarbons such as heavy naphtha, xylene etc., furfuryl alcohol, triethanol amine or mixtures thereof.
PTFE dispersion: 59-61% solids PTFE, particle size 170-210 nm, melting point (1st) 337° C., (2nd) 317° C.
PFA dispersion: 58-62% solids PFA, particle size 185-245 nm, PPVE content 2.9-3.6 wt %, MFR 1.3-2.7 g/10 min @ 372° C.
FEP dispersion: 54.5-55.5% solids FEP, particle size 160-220 nm, HFP content 9.3-12.4 wt %, MFR 11.8-21.3 g/10 min @ 372° C.

Example 1

Abrasion Resistance of Fluoropolymer and Micropulp

A series of wafer substrates cleaned and coated with primer are prepared as described above. Overcoats are applied to the primed substrates. The overcoats formed. in Example 1 have the following composition as shown in Table 2. The Micropulp loading ratio is varied in the range of from 0 wt % to 4.0 wt % of dry film. Four types of micropulp fibers varying by median volume average length (8, 20, 31, and 112) are tested and specified in the test results. Fiber lengths are determined by laser diffraction and the measured value approximates the volume average length as described above. The abrasion test results for samples tested by the Thrust Abrasion Weight Loss method described above are shown in Table 4 for different micropulp loadings and fiber lengths.

have the following compositions as shown in Table 5. The Micropulp loading ratio is held constant at 2 wt % of dry film. The micropulp has a median volume average length of 8 micrometers. The ultramarine blue loading (UMB) ratio is varied, 0 wt %, 8 wt %, and 12 wt % of dry film. The abrasion test results for examples tested by the Thrust Abrasion Weight Loss method described above are shown in 6 for the different ultramarine blue loading ratios.

TABLE 2

Composition modified by Micropulp

| | | Micropulp loading ratio in dry film wt % | | | | | | |
|---|---|---|---|---|---|---|---|---|
| | | 0.0 Wt % | 0.25 Wt % | 0.50 Wt % | 1.0 Wt % | 2.0 Wt % | 3.0 Wt % | 4.0 Wt % |
| Fluoropolymer | PFA dispersion | 37.9 | 37.9 | 37.9 | 37.9 | 37.9 | 37.9 | 37.9 |
| | PFA powder | 12.3 | 12.3 | 12.3 | 12.3 | 12.3 | 12.3 | 12.3 |
| Micropulp*** | | 0.00 | 0.0929 | 0.186 | 0.374 | 0.757 | 1.15 | 1.55 |
| Solvents | Water | 24.5 | 24.4 | 24.3 | 24.1 | 23.7 | 23.3 | 22.9 |
| | Other Organics* | 17.4 | 17.4 | 17.4 | 17.4 | 17.4 | 17.4 | 17.4 |
| Additives | Conductive mica | 1.89 | 1.89 | 1.89 | 1.89 | 1.89 | 1.89 | 1.89 |
| | Other additives** | 0.203 | 0.203 | 0.203 | 0.203 | 0.203 | 0.203 | 0.203 |
| Dispersing Agent | | 5.49 | 5.49 | 5.49 | 5.49 | 5.49 | 5.49 | 5.49 |
| Total | | 100 | 100 | 100 | 100 | 100 | 100 | 100 |

*Other organics may include solvents such as N-methyl-2-pyrrolidone, diethylene glycol monobutyl ether, hydrocarbons such as heavy naphtha, xylene etc., Oleic acid, triethanol amine or mixtures thereof.
**Other additives include non-conductive mica, carbon black.
***Micropulp and water are combined into a dispersion. The median volume average length of micropulp used in the experiment is shown in Table 3.
PFA dispersion: 58-62% solids PFA, particle size 185-245 nm, PPVE content 2.9-3.6 wt %, MFR 1.3-2.7 g/10 min @ 372° C.
PFA Powder: TFE/PPVE fluoropolymer resin containing 3.5-4.6 wt % PPVE having a melt flow rate of 9.7-17.7 g/10 min and an average particle size of 20 micrometers.

TABLE 3

Volume average length of micropulp

| Sample | Median volume average length (micrometers) |
|---|---|
| 1 | 112 |
| 2 | 31 |
| 3 | 20 |
| 4 | 8 |

TABLE 4

Thrust Abrasion Test Results (Micropulp)

| | | Wear index (cycles per 1 mg wear) Micropulp loading ratio in dry film wt % | | | | | | |
|---|---|---|---|---|---|---|---|---|
| | | 0 (control) | 0.25 | 0.50 | 1.0 | 2.0 | 3.0 | 4.0 |
| Median volume Average Length (micrometers) | 112 | 260 | 570 | 530 | 700 | 830 | 790 | 770 |
| | 31 | 260 | 390 | 430 | 650 | 880 | 880 | 940 |
| | 20 | 260 | 510 | 610 | 770 | 1250 | 1250 | 1200 |
| | 8 | 260 | 430 | 650 | 880 | 1300 | 1200 | 1100 |

Example 2

Abrasion Resistance of Fluoropolymer, Micropulp and UMB

A series of wafer substrates cleaned and coated with primer are prepared as described above. Overcoats are applied to the primed substrates. The overcoats formed in the Example 2

TABLE 5

Overcoat modified by Micropulp and UMB

| | | Ultramarine blue loading ratio in dry film wt % | | |
|---|---|---|---|---|
| | | 0.0 | 8.0 | 12.0 |
| | | Micropulp loading ratio in dry film wt % | | |
| | | 2.0 Wt % | 2.0 Wt % | 2.0 Wt % |
| Fluoropolymer | PFA dispersion | 37.9 | 37.9 | 37.9 |
| | PFA powder | 12.3 | 12.3 | 12.3 |
| Micropulp | Sample 4** | 0.757 | 0.824 | 0.862 |
| Solvents | Water | 23.7 | 20.4 | 18.5 |
| | Organics | 17.4 | 17.4 | 17.4 |
| Additives | Conductive mica | 1.89 | 1.89 | 1.89 |
| | Ultramarine blue | 0.00 | 3.30 | 5.17 |
| | Other additives | 0.203 | 0.203 | 0.203 |
| Dispersing Agent | | 5.49 | 5.49 | 5.49 |
| Total | | 100 | 100 | 100 |

**Micropulp Sample 4: 8 micrometers median volume average length

TABLE 6

Thrust Abrasion Test Results (Micropulp and UMB)

| Ultramarine blue loading ratio in dry film, wt % | 0 (control) | 8.0 | 12.0 |
|---|---|---|---|
| Median volume average length (micrometers) 8 | 1300 | 3300 | 4300 |

The overcoat layers formed in the following Examples A, 3 and 4 have the following pre-bake compositions:

TABLE 7

Overcoat Compositions for Examples A, 3 and 4

| Ingredient | A Control Wt % | 3 UMB Wt % | 4 UMB and Micropulp Wt % |
|---|---|---|---|
| Fluoropolymer | | | |
| PFA dispersion | 37.9 | 36.3 | 36.3 |
| PFA Powder | 12.3 | 11.7 | 11.7 |
| Aramid fiber micropulp*** | — | — | 0.3 |
| Solvents | | | |
| Water | 24.8 | 25.7 | 25.3 |
| Other Organics* | 17.4 | 16.7 | 16.7 |
| Additives | | | |
| Conductive mica | 1.9 | 1.8 | 1.8 |
| Ultramarine Blue | — | 2.4 | 2.5 |
| Other additives** | 0.2 | — | — |
| Dispersing Agent | 5.5 | 5.4 | 5.4 |
| Total | 100 | 100 | 100 |

*Other organics may include solvents such as N-methyl-2-pyrrolidone, diethylene glycol monobutyl ether, hydrocarbons such as heavy naphtha, xylene etc., Oleic acid, triethanol amine or mixtures thereof.
**Other pigments include non-conductive mica, carbon black,
***Aramid fiber and water are combined into a dispersion, fiber median volume average length 108 micrometers
PFA dispersion: 58-62% solids PFA, particle size 185-245 nm, PPVE content 2.9-3.6 wt %, MFR 1.3-2.7 g/10 min @ 372° C.
PFA Powder: TFE/PPVE fluoropolymer resin containing 3.5-4.6 wt % PPVE having a melt flow rate of 9.7-17.7 g/10 min and an average particle size of 20 micrometers.

Comparative Example A

Control Coating

A layer of primer as described above is applied to an aluminum test roller (10.5 in, 26.7 cm long; 1.125 in, 2.9 cm diameter) followed by baking at 150° C. for 5 minutes. The dry film thickness (DFT) of the primer layer is 8-12 micrometers. Overcoat A containing no ultramarine blue (UMB) and no micropulp is applied followed by baking at 800° F. (427° C.) for 10 minutes. The total dry film thickness (DFT) of the coating is 35-45 micrometers. This coating when tested in the roller abrasion test as described above results in 1068 cycles/micron wear. The coating was subjected to the above described release test by testing in a commercial copier machine, Ricoh AF 350. Toner contamination resulted after about 35,000 copies due to coating wear.

Example 3

Ultramarine Blue (UMB) Modification

A layer of primer as described above is applied to an aluminum test roller (10.5 in, 26.7 cm long; 1.125 in, 2.9 cm diameter) followed by baking at 150° C. for 5 minutes. The dry film thickness (DFT) of the primer layer is 8-12 micrometers. Overcoat 3 containing ultramarine blue (UMB) is applied followed by baking at 800° F. (427° C.) for 10 minutes. The total dry film thickness (DFT) of the coating is 35-45 micrometers. This coating when tested in the roller abrasion test as described above results in 3814 cycles/micron wear. The coating was subjected to the above described release test by testing in a commercial copier machine, Ricoh AF 350. Toner contamination resulted after about 50,000 copies due to coating wear.

Example 4

Aramid Fiber Micropulp Plus UMB

A layer of primer as described above is applied to an aluminum test roller (10.5 in, 26.7 cm long; 1.125 in, 2.9 cm diameter) followed by baking at 150° C. for 5 minutes. The dry film thickness (DFT) of the primer layer is 8-12 micrometers. Overcoat 4 containing aramid fiber micropulp having a median volume average length of 108 micrometers and ultramarine blue (UMB) is applied followed by baking at 800° F. (427° C.) for 10 minutes. The total dry film thickness (DFT) of the coating is 35-45 micrometers. This coating when tested in the roller abrasion test as described above results in 6500 cycles/micron wear. The surface of this coating can be honed to a smooth surface generally free of topography to improve its release property. The coating was subjected to the above described release test by testing in a commercial copier machine, Ricoh AF 350. The test was stopped after about 150,000 copies. Observed was less picker finger wear than the roller produced by Control Example A and there was no toner contamination.

TABLE 8

Summary of Roller Abrasion Test Results

| | A Control | 3 UMB | 4 UMB and micropulp |
|---|---|---|---|
| UMB wt %, dry film | 0 | 6.4 | 7.4 |
| Micropulp wt %, dry film | 0 | 0 | 1.0 |
| Cycles per micron | 1100 | 3800 | 6500 |

Example 5

Aramid Fiber Micropulp in PVF Film

Film A is prepared from a homogeneous dispersion of polyvinyl vinyl fluoride (PVF) in propylene carbonate which is made by grinding 40 parts of PVF with 60 parts propylene carbonate in 1 mm glass media using a Model LMJ 2 mill (available from Netzsch Inc of Exton, Pa.). With the aid of a 5-mil (125 micrometers) doctor blade, a film of the PVF/propylene carbonate is applied to glass, baked for 5 minutes at 180° C. in an electric oven (Hotpack, Philadelphia Pa.) volatilizing the propylene carbonate which coalesces the PVF film. Self supporting Film A, nominally 1 mil (25 micrometers) thick is removed from the glass.

Films B, C, D, E, F and G are prepared from the same homogeneous mixture of PVF in propylene carbonate to which has been added a dispersion of aramid fiber micropulp in Essex N-methyl pyrrolidone (NMP) using an air propeller to provide a uniform mixture. The amount of micropulp and median volume average length of the fibers in each of the films is specified in Table 9.

As above Films B, C, D, E are drawn down on glass with a 5-mil (125 micrometers) doctor blade and baked for 5 minutes at 180° C. in an electric oven (Hotpack, Philadelphia Pa.). The resultant self supporting films are nominally 1 mil (25 micrometers) thick and are removed from the glass.

Using a platen press (Wabash, Wabash Indiana), Films A, B, C, D, and E are pressed onto a sheet of black ABS and subjected to abrasion testing using a Reciprocating Arm AbrasionTester (available from Byk Garnder, Columbia Md.) with nylon brush (WA 2262 also available from Byk Gardner). As described above using ASTM D523, 60 degree gloss measurements are obtained after 0, 50 cycles where one cycle is one reciprocating to and fro movement of the brush. Films are evaluated for gloss retention. Films D and E with 1 wt % (dry basis) aramid micropulp show a marked improvement in abrasion resistance evidenced by the high (at least 94%) gloss retention as compared to the gloss retention (86%) of Film A without the micropulp and gloss retention (84-86%) of Films B and C containing 0.25 wt % micropulp. In terms of decrease in gloss for Film A (11 units) as compared to the much smaller decrease in gloss of Film E (5 units), the improvement in abrasion resistance by this test is greater than 100%. These results showed an improvement in abrasion resistance independent of fiber length.

TABLE 9

PVF with Micropulp

| Ingredient | Film A (Control) | Film B | Film C | Film D | Film E | Film F (Control) | Film G |
|---|---|---|---|---|---|---|---|
| Micropulp* wt % dry film (median volume average length 62.1) | 0 | 0.25 | 0 | 1.0 | 0 | 0 | 0 |
| Micropulpulp wt % dry film (median volume average length 7.5) | 0 | 0 | 0.25 | 0 | 1.0 | 0 | 0 |
| Micropulp wt % dry film (median volume average length 19.4) | 0 | 0 | 0 | 0 | 0 | 0 | 0.5 |

*NMP Dispersion

TABLE 10

Summary Reciprocating Arm Abrasion Tests

| | Cycles | |
|---|---|---|
| | 0 | 50 |
| | | 60 Degree Gloss |
| Film A | 80 | 69 |
| Film B | 79 | 66 |
| Film C | 79 | 68 |
| Film D | 80 | 76 |
| Film E | 80 | 75 |

As described above Films F and G are drawn down on glass using 7-mil doctor blade (178 micrometers) and baked for 5 minutes at 180° C. in an electric oven (Hotpack, Philadelphia Pa.). The resultant self supporting films are nominally 1.5 mils (38 microns) thick and are removed from the glass. The toughness of the films are compared using ASTM D636 (Instron Model 1011, Canton Mass.). Both Film F and Film G measured 5400 lbf/square inch for tensile strength. However the elongation of Film G which contains 0.5 wt % aramid micropulp is 165% as compared to an elongation of 58% of Film F containing no aramid micropulp. Greater elongation indicates films with aramid micropulp are surprisingly much tougher allowing for the use of thin but tough films in many aircraft interior applications which demand light weight films that exhibit good flame resistance and low smoke generation, the known qualities of fluoropolymer films.

What is claimed is:

1. A film comprising a composition of fluoropolymer and an effective amount of micropulp to increase the abrasion resistance of the surface of said film formed from said composition by at least 25% as compared to the surface of said film formed from the fluoropolymer by itself, wherein said micropulp comprises fibrils having cross-sections with a width dimension of less than 10 nanometers in diameter.

2. The film of claim 1 wherein the abrasion resistance of said surface of said film formed from a composition comprising fluoropolymer and an effective amount of micropulp is increased at least 50% as compared to the surface of said film formed from the fluoropolymer by itself.

3. The film of claim 1 wherein said micropulp is an aromatic polyamide.

4. The film of claim 3 wherein said aromatic polyamide is poly(p-phenylene terephthalamide) or poly(m-phenylene isophthalamide) or mixtures thereof.

5. The film of claim 1 wherein said fluoropolymer is melt processible or non-melt processible.

6. The film of claim 1 also containing an effective amount of electrically conductive particulate material.

7. The film of claim 6 wherein said electrically conductive particulate material is mica coated with electrically conductive material.

8. The film of claim 1 also containing an effective amount of pigment to further increase the abrasion resistance of film formed from said composition as compared to film formed from the fluoropolymer by itself.

9. The film of claim 8 wherein said pigment is a zeolite.

10. The film of claim 1 containing both electrically conductive particulate material and pigment.

11. The film of claim 10 wherein the total amount of said micropulp, electrically conductive particulate material, and pigment is at least 5 wt % based on the total weight of these ingredients plus the fluoropolymer, with the increase in abrasion resistance being at least 50% as compared to the fluoropolymer by itself, and with the release of said film being characterized by copier toner not sticking to said film when used as a film coating on a fuser roll.

12. The film of claim 1 wherein said micropulp is characterized by a volume average fiber length of 0.01 to 125 micrometers.

13. The film of claim 1 wherein said micropulp is characterized by a volume average fiber length of 5 to 30 micrometers.

14. The film of claim 1 wherein said film is on a fuser roll.

* * * * *